United States Patent
Yen et al.

(10) Patent No.: US 7,088,788 B2
(45) Date of Patent: Aug. 8, 2006

(54) COMMUNICATION DEVICE AND DIGITAL ENCODING METHOD THEREOF

(75) Inventors: An-Yu Yen, Hsinchu (TW); Tzong-Yu Wang, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 836 days.

(21) Appl. No.: 10/050,123

(22) Filed: Jan. 18, 2002

(65) Prior Publication Data

US 2003/0139201 A1 Jul. 24, 2003

(51) Int. Cl.
*H03K 9/00* (2006.01)
*H04L 27/06* (2006.01)

(52) U.S. Cl. .................. 375/316; 375/324; 375/325

(58) Field of Classification Search .............. 375/295, 375/146, 296, 297, 316, 324, 325; 710/8
See application file for complete search history.

(56) References Cited

U.S. PATENT DOCUMENTS

| | | | |
|---|---|---|---|
| 5,995,017 A * | 11/1999 | Marsh et al. ............ 340/10.2 |
| 6,275,682 B1 * | 8/2001 | Yen et al. ............... 455/41.2 |
| 6,509,845 B1 * | 1/2003 | Tanaka ..................... 341/22 |
| 6,519,290 B1 * | 2/2003 | Green ...................... 375/259 |
| 6,950,890 B1 * | 9/2005 | Liu et al. .................. 710/72 |
| 2001/0056501 A1 * | 12/2001 | Law et al. ................ 709/248 |
| 2003/0014574 A1 * | 1/2003 | Kuo et al. ................. 710/62 |
| 2003/0014575 A1 * | 1/2003 | Wang et al. .............. 710/62 |
| 2003/0083056 A1 * | 5/2003 | Wu et al. ................. 455/420 |
| 2003/0084210 A1 * | 5/2003 | Wu et al. ................... 710/9 |

* cited by examiner

*Primary Examiner*—Chieh M. Fan
*Assistant Examiner*—Jason Perilla
(74) *Attorney, Agent, or Firm*—Bacon & Thomas, PLLC

(57) ABSTRACT

The present invention provides a communication device and a digital encoding method thereof. The communication device comprises a first and a second emitting devices respectively communicating at a first and a second communication channels. Each emitting device emits the same piece of data through continually emitting the same signal section for six times. The signal section is encoded in five bits. A receiving device alternately jumps between the first and second communication channels to receive signal sections emitted by the first and second emitting devices. The time of the receiving device at each communication channel comprises a phase lock time and a reception time of a whole signal section. The present invention has the advantages of having a very good quality of data transmission, reducing the cost, saving installation space, and facilitating the operation.

3 Claims, 5 Drawing Sheets

COMMUNICATION DEVICE AND DIGITAL ENCODING METHOD THEREOF

FIELD OF THE INVENTION

The present invention relates to a wireless communication device and, more particularly, to a wireless communication device making use of frequency jumping to receive signals and an encoding method thereof for data transmission.

BACKGROUND OF THE INVENTION

Along with continual development of the information industry and frequent usage of the Internet and personal computers, fast circulation of data arises, and the distances between different regions seem shortened. Generally, when a personal computer is used, it is necessary to take cable length into consideration because a cable is used to connect a data input device like a keyboard, a mouse, or a joystick with the computer. A user can only input data within a certain small range, resulting in low efficiency of mobility. Therefore, wireless keyboards, mice, or joysticks appear due to progress of wireless communication.

When both a conventional wireless mouse and a conventional wireless keyboard are used, two sets of receiving modules are disposed on a host computer to respectively receive individual data emitted by internal emitting modules of the mouse and the keyboard. In addition to having a high cost, this way of design requires a larger space for disposition. On the other hand, because the time division multiple access (TDMA) is utilized when a conventional emitting module transmits signals, a much higher transmission speed is required to achieve a good quality of reception, resulting in a higher power consumption.

Accordingly, the present invention aims to propose a communication device making use of frequency jumping to receive data of multiple emitting devices and an encoding way thereof for signal transmission.

SUMMARY OF THE INVENTION

The primary object of the present invention is to propose a communication device, whereby a receiving device can receive data of multiple emitting devices through the emitting devices continually emitting a respective same signal for a plurality of times and by means of frequency jumping of the receiving device, thereby reducing the cost and facilitating the operation.

Another object of the present invention is to propose a communication device capable of saving installation space.

Yet another object of the present invention is to propose a communication device letting transmission of data achieve a very good quality.

Still yet another object of the present invention is to propose a special encoding method of communication device to have power-saving effect.

According to the present invention, a communication device comprises a first emitting device and a second emitting device, which select a first communication channel and a second communication channel of different frequencies for communication, respectively. Each emitting device emits the same piece of signals through continually emitting the same signal section for six times. The signal section is encoded in five bits. A receiving device alternately jumps frequencies between the first and second communication channels to receive the signal sections emitted by the first and second emitting devices. Moreover, the time of the receiving device among each communication channel comprises a phase lock time and a reception time of the whole signal section.

The various objects and advantages of the present invention will be more readily understood from the following detailed description when read in conjunction with the appended drawing, in which:

DETAILED DESCRIPTION OF THE PREFERRED EMBODIMENTS

The present invention is characterized in that a receiving device performs reception of data by means of frequency jumping between at least two communication channels to receive data emitted by at least two emitting devices.

Figure 1:
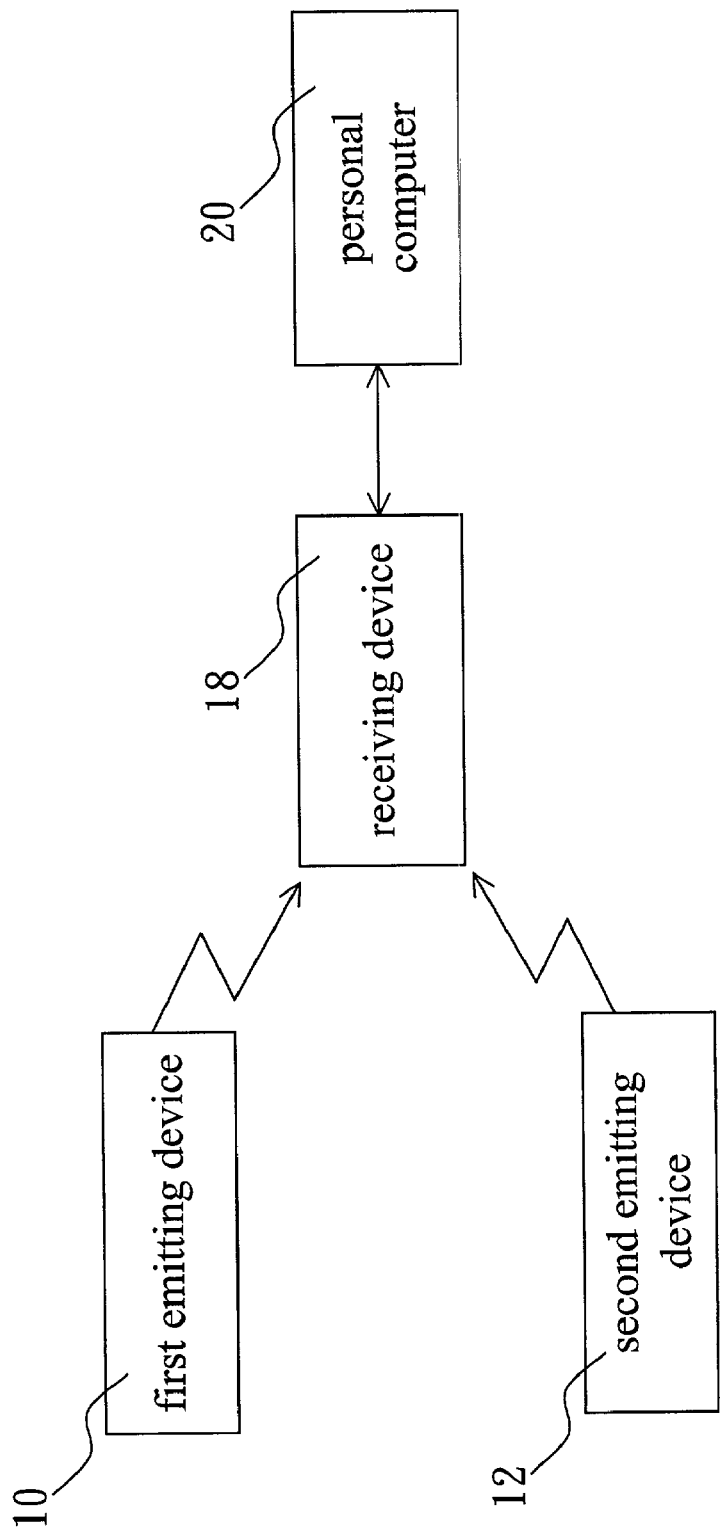
FIG. 1 is a communication block diagram of the present invention.
Figure 2:
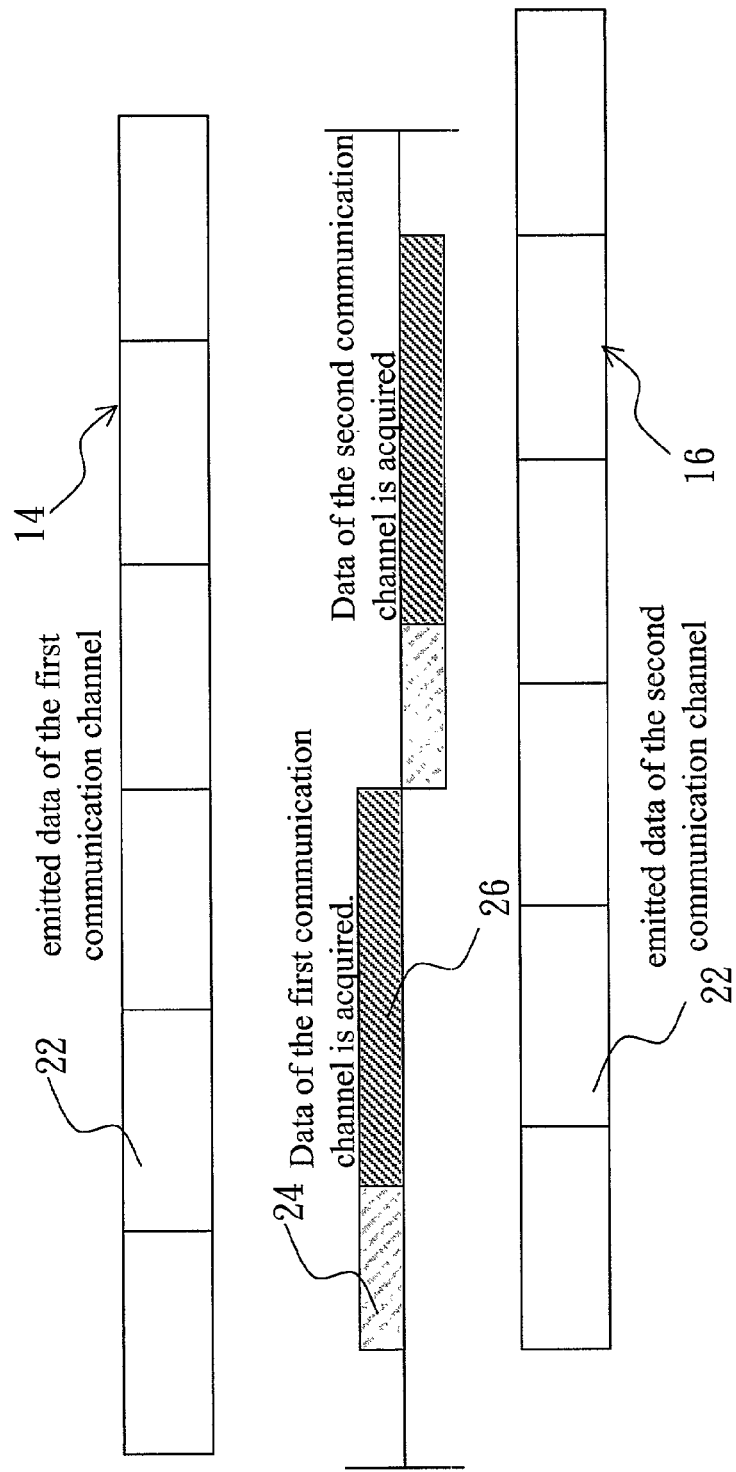
FIG. 2 is a diagram showing the procedures of an emitting device emitting signals and a receiving device receiving signals by means of frequency jumping of the present invention.

As shown in FIG. 1, a communication device of the present invention comprises two emitting devices, a first emitting device 10 and a second emitting device 12, which are respectively disposed on peripheral input devices of computer like wireless keyboards or wireless mice. The two emitting devices 10 and 12 respectively select a first communication channel 14 and a second communication channel 16 of different frequencies to emit signals to a receiving device 18, which is connected to a personal computer 20 via a connection interface. As shown in FIG. 2, the emitting device 10 emits a respective same piece of signals through continually emitting a respective identical signal section 22 for six times, and the emitting device 12 emits another respective same piece of signals through continually emitting another identical signal section 22 for six times. The receiving device 18 alternately jumps back and forth between the first and second communication channels 14 and 16 to receive the respective signal sections 22 emitted by the first and second emitting devices 10 and 12. Moreover, the time of the receiving device 18 among each of the communication channels 14 and 16 comprises a phase lock time 24 and a reception time 26 of the whole signal section.

Figure 3:
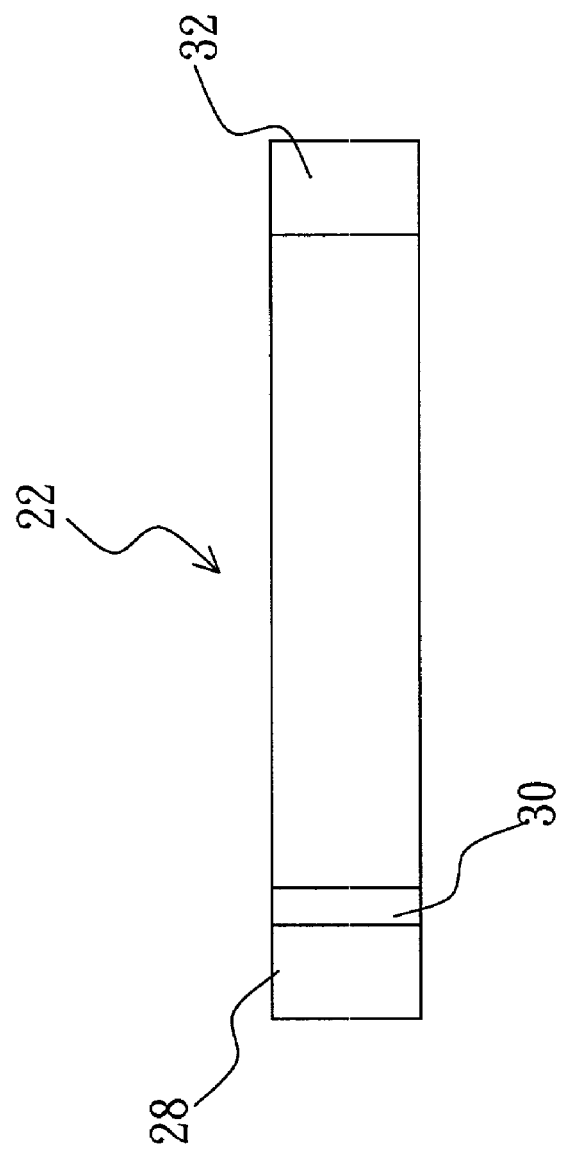
FIG. 3 is a diagram of a signal section of the present invention.

As shown in FIG. 3, an ID 28 and a serial number 30 are arranged at the start of each signal section 22, and a check sum 32 is arranged at the end of each signal section 22. Integrity of a signal section 22 can be judged by detecting the ID 28, the serial number 30, and the check sum 32.

During the process of communication, the receiving device 18 jumps frequencies between the two communication channels 14 and 16. In addition to the time for receiving the signal section 22, the time among each of the communication channels 14 and 16 also comprises the lock phase time 24 needed by the emitting device for continually emitting the same signal section 22 for at least three times to ensure that a whole signal section 22 can be received by the receiving device 18. Therefore, the emitting devices 10 and 12 emit the same piece of data through continually emitting the signal sections 22 for three times the number of the communication channels 14 and 16. Thereby, one whole signal section 22 can be certainly received by the receiving device 18 jumping between a plurality of communication channels 14 and 16 when the emitting devices 10 and 12 emit signals irregularly.

Figure 4:
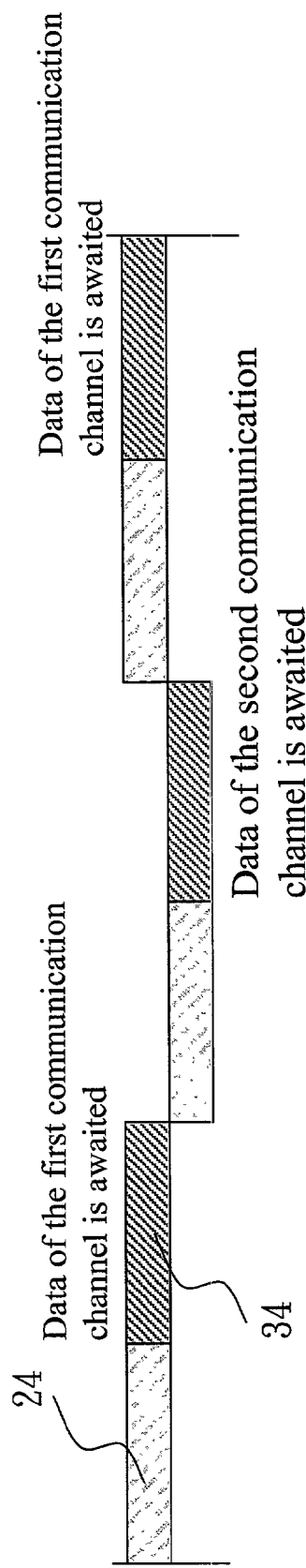
FIG. 4 is a diagram showing the procedures of frequency jumping of the receiving device of the present invention when there is no data emitted.

The emission time of each signal section 22 is about 2.639 milliseconds. As shown in FIG. 4, when the two emitting devices 10 and 12 do not emit signals, the receiving device 18 jumps to the next communication channel 14 or 16 after the phase lock time 24 and a waiting time 34 of a signal section 22 elapse. In this way, the receiving device 18 alternately jumps frequencies between each communication channel 14 or 16 for reception of signals.

In the present invention, only a receiving device 18 is used to receive data of multiple emitting devices by means of frequency jumping. In addition to facilitating use, installation space and power consumption of communication device can be greatly saved, and the cost can be reduced. Quality of data transmission can be ensured without missing any input signal because the emitting device continually emits the same signal section for six times.

On the other hand, during the process of transmission, the conventional 16 sets of signals encoded in four bits are converted into signal sets encoded in five bits. The five-bit codes undergo a sifting procedure to let the number of successive identical codes not exceed two so that there are at most four successive identical bits in each signal of communication data. The five-bit codes are summarized as follows,

TABLE 1

| Item | Five-bit code |
|---|---|
| 1 | 00100 |
| 2 | 00101 |
| 3 | 00110 |
| 4 | 01001 |
| 5 | 01010 |
| 6 | 01011 |
| 7 | 01100 |
| 8 | 01101 |
| 9 | 10010 |
| 10 | 10011 |
| 11 | 10100 |
| 12 | 10101 |
| 13 | 10110 |
| 14 | 11001 |
| 15 | 11010 |
| 16 | 11011 |

As can be known from the table, there are at most two 0s or 1s in each signal set so that there are at most four successive 0s or 1s when two adjacent sets of signals are transmitted. Therefore, bad quality of communication because there are too many successive 0s or 1s can be improved when signals are transmitted in the conventional four-bit codes. Moreover, the special 5-bit encoding method can also let the present invention achieve good quality of reception at relative low transmission speeds. The sifting procedure of the above 5-bit codes is described below.

Figure 5:
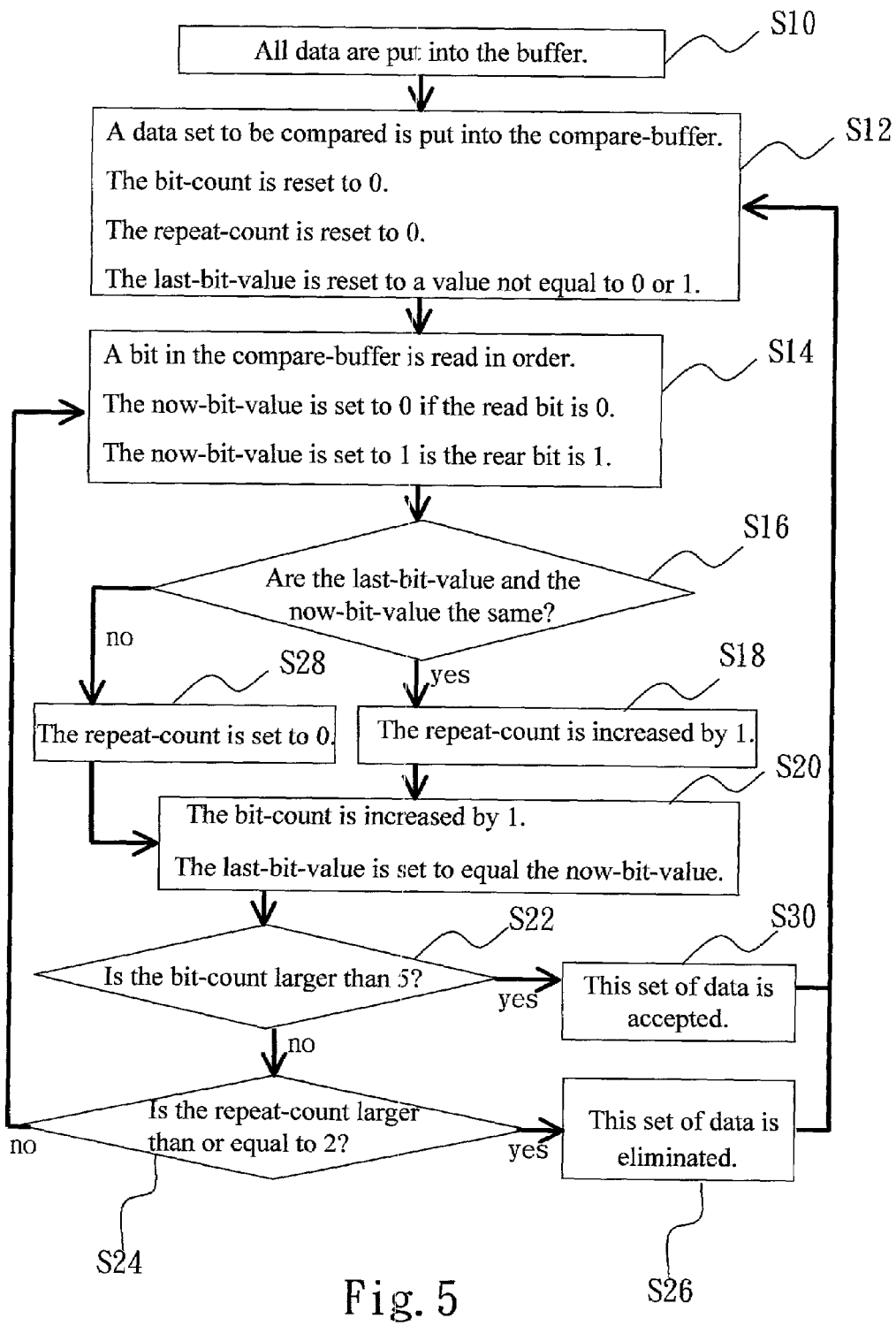
FIG. 5 is a diagram showing the procedures of sifting 5-bit encoded signals of the present invention.

As shown in FIG. 5, in Step S10, all non-repetitious five-bit sets of data are put into a buffer. A bit-count is set to represent the bit position of the set of data read currently. A repeat-count represents the number of identical value successively read currently. A last-bit-value represents the value of the last read bit. A now-bit-value represents the value of the currently read bit. When the sifting is initially performed, a five-bit data in the buffer to be compared is put into a compare-buffer, the bit-count and the repeat-count are reset to 0, and the last-bit-value and the now-bit-value are set to any value not equal to 0 or 1 (Step S12). Next, a bit value of the compare-buffer is read in order. The now-bit-value is set to 0 if the read value is 0, the now-bit-value is set to 1 if the read value is 1 (Step S14). The last-bit-value and the now-bit-value are then compared (Step S16). The repeat-count is increased by 1 if they are the same (Step S18). Subsequently, the bit-count is increased by 1, and the last-bit-value is set to equal the now-bit-value (Step S20). Whether the bit-count exceeds 5 is judged for finishing comparison of this piece of data (Step S22). If done, this piece of data is accepted and the sifting process is repeated again (Step S30). If not done, whether the repeat-count is larger than or equal to 2 is judged (Step 34). If the answer is negative, Step S14 is jumped back to for continual comparison of bit value; otherwise, this piece of data is eliminated because there are already two successive 0s or 1s (Step S26). Step S12 is then jumped back to for continual reading of the next set of data. In the above Step S16, if the last-bit-value and the now-bit-value are not the same, the repeat-count is set to 0 (S28), and Step 20 is then performed.

After the above sifting procedure, 16 sets of five-bit codes in agreement with restriction can be obtained to replace the conventional 4-bit codes for transmission of data so that better quality of transmission can be acquired.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A communication device applied to wireless peripherals of a computer, said communication device comprising:
    at least two emitting devices including a first emitting device and a second emitting device, said first and second emitting devices respectively communicating at a first communication channel and a second communication channel, each of said emitting devices continually emitting a respective plurality of identical whole signal sections in a time interval; and
    a receiving device jumping at least between said first and second communication channels, the time of said receiving device among each of said communication channels comprising a communication channel phase lock time, a reception time of an entire one of the plurality of identical whole signal sections, and the time of any partial signal section between the phase lock time and the reception time.

2. The communication device as claimed in claim 1, wherein the number of times for which each of said emitting devices emits the same whole signal section in the time interval is at least three times a number of communication channels between which said receiving device jumps.

3. The communication device as claimed in claim 1, wherein each of said whole signal sections is transferred by using five-bit digital codes.

* * * * *